(12) United States Patent
Gensert et al.

(10) Patent No.: US 6,179,345 B1
(45) Date of Patent: Jan. 30, 2001

(54) DEVICE FOR CONNECTING TWO TUBULAR PIPING PARTS

(75) Inventors: Heiko Gensert, Waiblingen; Horst Schneider, Gammelshausen; Arndt Peters, Weinstadt; Helmut Wierzba, Schwabach, all of (DE)

(73) Assignees: Daimler-Benz Aktiengesellschaft, Stuttgart; Leistritz Aktiengesellschaft & Co. Abgastechnik, Fuerth, both of (DE)

( * ) Notice: Under 35 U.S.C. 154(b), the term of this patent shall be extended for 0 days.

(21) Appl. No.: 09/120,783

(22) Filed: Jul. 22, 1998

(30) Foreign Application Priority Data

Jul. 22, 1997 (DE) .............................. 197 31 367

(51) Int. Cl.⁷ ................................. F16L 37/08
(52) U.S. Cl. .................. 285/305; 285/420; 285/906; 285/38
(58) Field of Search .................. 285/305, 317, 285/38, 420, 906

(56) References Cited

U.S. PATENT DOCUMENTS

| D. 135,689 | * | 5/1943 | Rocic | 285/420 X |
| 2,134,858 | * | 11/1938 | Clark | 285/420 X |
| 2,443,272 | * | 6/1948 | Sagen | 285/420 X |
| 3,314,696 | * | 4/1967 | Ferguson et al. | 285/305 X |
| 4,181,332 | * | 1/1980 | Neumann | 285/420 X |
| 5,000,614 | * | 3/1991 | Walker | 285/305 X |
| 5,433,183 | * | 7/1995 | Vansnick | 285/305 X |

FOREIGN PATENT DOCUMENTS

| 29 13 561 | 10/1979 | (DE) . | |
| 2913561 | * | 10/1979 | (DE) | 285/420 |
| 1142476 | * | 2/1969 | (GB) | 285/305 |
| 1 570 006 | 6/1980 | (GB) . | |
| 2 087 021 | 5/1982 | (GB) . | |
| 2 268 238 | 1/1994 | (GB) . | |
| 2 320 542 | 6/1998 | (GB) . | |

* cited by examiner

Primary Examiner—Dave W. Arola
(74) Attorney, Agent, or Firm—Kenyon & Kenyon

(57) ABSTRACT

A device for connecting two tubular piping parts, in particular piping parts in a motor vehicle exhaust system, has two connector pieces with a sealing device being mounted between the connector pieces. The connector pieces are stressed against each other in axial direction by a spring device. The spring device has a wire spring which surrounds one connector piece at least partially with two spring branches and is supported by this connector piece. The wire spring is stressed against a stop on the other connector with the spring branches or another area of the wire spring.

27 Claims, 5 Drawing Sheets

DEVICE FOR CONNECTING TWO TUBULAR PIPING PARTS

FIELD OF THE INVENTION

The present invention concerns a device for connecting two tubular piping parts, and in particular, a device for connecting piping parts in a motor vehicle exhaust system.

RELATED TECHNOLOGY

A device for connecting two tubular piping parts of the generic type is known from German Patent Application No. 44 44 550 A1. The spring device for generating a pre-stress force between the two connector pieces has a curved washer which supports itself on one connector piece and another curved washer that is mechanically attached to the other connector piece. The two curved washers are pre-stressed against each other by clamps. The previously known device is relatively complicated in structure and in addition requires a relatively large additional space.

A similar device with which a motor vehicle engine exhaust system can also be decoupled from vibration generated by the engine is known from French Patent 2 360 028. In the French patent, a spiral spring which presses the two piping parts apart in the axial direction is stressed between the two connector pieces. This piping connection has the disadvantage that it inadequately decouples engine vibrations.

In German Patent Application No. 196 53 906.4, which is not necessarily prior art to the present application, a device is described for decoupling piping parts in the motor vehicle exhaust system in which a spring device with two spring branches is inserted into slots in a connector piece of a piping part and the spring branches are supported on part of an end section. However, this older device is also relatively complicated.

SUMMARY OF THE INVENTION

An object of the present invention is to create a device for connecting piping parts, in particular for use in a motor vehicle exhaust system. Decoupling of engine vibrations can be achieved in a simple and cost-effective manner using as little space as possible.

The present invention therefore provides a device for connecting two tubular piping parts, in particular piping parts in the motor vehicle exhaust system, the piping parts having connector pieces, between which a sealing device is mounted and the connector pieces being stressed against each other in axial direction by a spring device. The spring device contains a wire spring (5), which surrounds one of the two connector pieces (1a, 2, 3a, 3c) at least partially with two spring branches (5a, 5b) and is supported by this connector piece (3a, 3c) while it is stressed with the same spring branches (5a, 5b) or another area of wire spring (5) against a stop on the other connector piece (2, 1a).

With the device according to the present invention, two exhaust pipes in a motor vehicle exhaust system can be connected in an optimum manner so that they are gas tight and the vibration generated in the exhaust system by the engine can be decoupled from the vehicle body.

In contrast to previous solutions, the device according to the present invention can achieve space requirement, manufacturing feasibility, cost and assembly goals. In particular, the spring device made from a wire spring, in particular from round wire, can be produced especially cost-effectively. In addition, this connection requires very little space with simultaneously very simple shaping at the pipe ends and/or simple design of the connector pieces.

Additional decoupling elements in the exhaust system can be omitted because of the connecting device according to the present invention, since the separating point between front part and rear part of the exhaust system can also take on the function of decoupling element in the usual manner. This both saves costs and decreases the exhaust system weight. Advantageous designs and further developments of the invention are described below.

BRIEF DESCRIPTION OF THE FIGURES

Embodiments of the present invention are explained below with reference to the drawings; in which.

DETAILED DESCRIPTION

Figure 1:
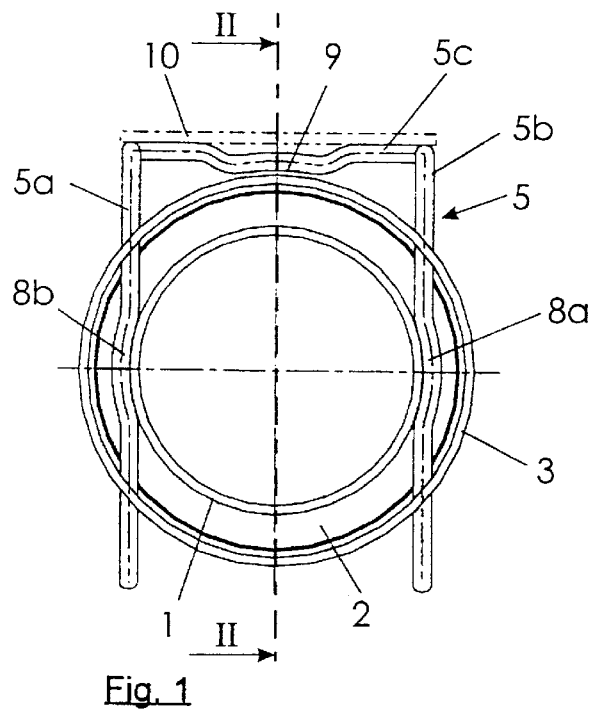
FIG. 1 shows a view of a first embodiment of the present invention from the front.
Figure 2:
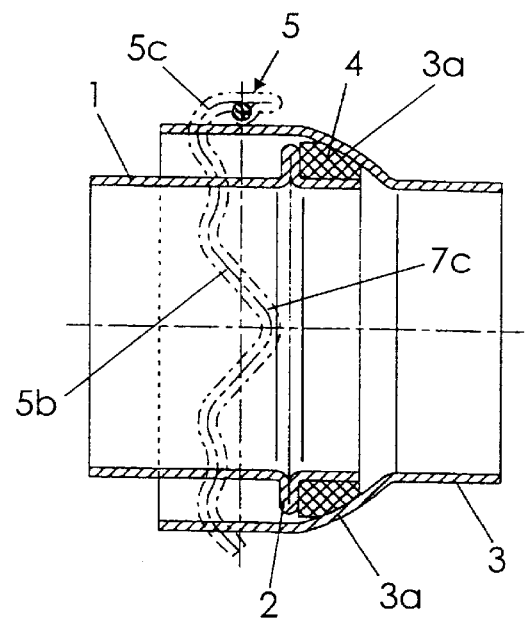
FIG. 2 shows a cross-section along Line II—II in FIG. 1.
Figure 3:
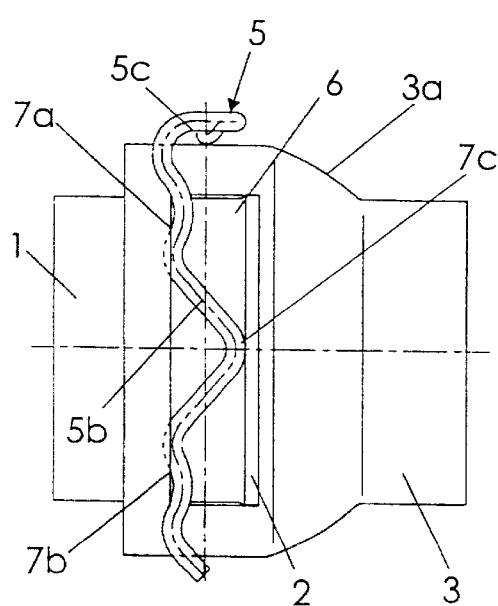
FIG. 3 shows a side view of the embodiment according to FIG. 1.
Figure 4:
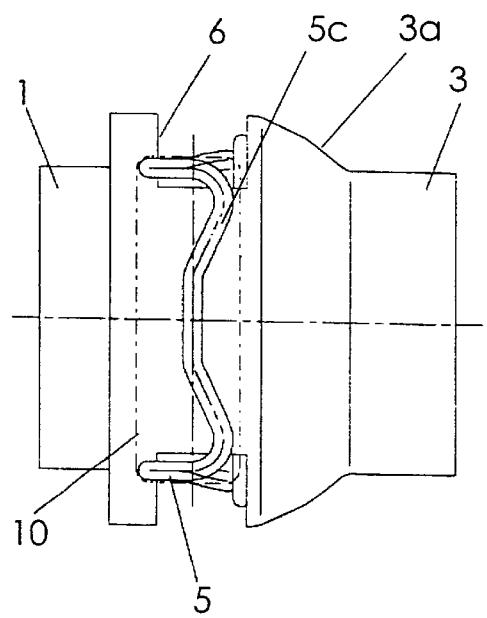
FIG. 4 shows a top view of the embodiment according to FIG. 1.

For the sake of uniformity and better understanding, the description which follows of the embodiments using the individual figures identifies corresponding parts with the same reference numbers.

As shown, for example, in FIGS. 1–4, in order to connect two exhaust pipes 1 and 3 to each other, provide sealing, and at the same time decouple from vibrations generated by an engine that is not shown, a sealing ring 4 is inserted between the two pipe ends. Wire spring 5 as a spring device, which is manufactured of round wire, presses the two ends of exhaust pipes 1 and 3 against each other. Exhaust pipe 1 that extends into exhaust pipe 3 as an internal pipe has on its end bead 2 as a connector piece, which wire spring 5 having an appropriately bent shape contacts on two opposite sides.

Exhaust pipe 3 extends with connector piece 3a over sealing ring 4 in the axial direction and is provided with slots 6 on two opposite points. Wire spring 5 has a stirrup shape with two side branches 5a and 5b and one cross part 5c connecting the two side branches to each other. It can be seen from FIGS. 2 and 3 that two side branches 5a and 5b contact two points 7a and 7b on each side on one wall of slot 6 of outer pipe 3, i.e., its connector piece 3a. With opposite convexity 7c on wire spring 5, which is located between two points 7a and 7b, the wire spring also contacts each side on bead 2 of exhaust pipe 1.

FIG. 1 shows that wire spring 5 surrounds inner pipe 1 on both sides with slight outer convexities 8a and 8b. At the same time, this centers wire spring 5 and secures it against slipping out. In the upper area, wire spring 5 also fits flush on outer pipe 3 with a slight internal convexity 9. Because of internal convexity 9, a stop is also produced for wire spring 5 which aids is assembly.

A press-in plate 10 (see side view in FIG. 1 and top view in FIG. 4 in dotted lines) may be mounted on wire spring 5 on upper cross part 5c, which facilitates assembly. The connection of press-in plate 10 with wire spring 5 can be in any desired manner, e.g., by welding, soldering or gluing.

Figure 5:
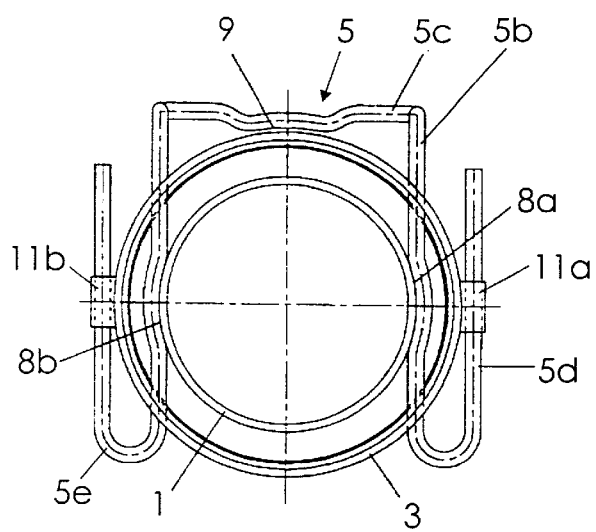
FIG. 5 shows a front view of a second embodiment.
Figure 6:
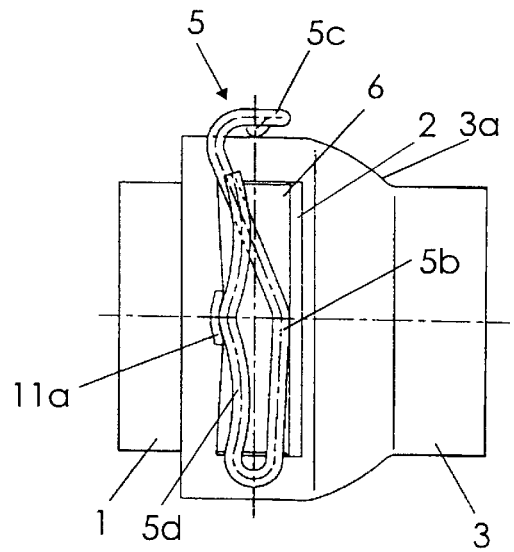
FIG. 6 shows a side view of the second embodiment.
Figure 7:
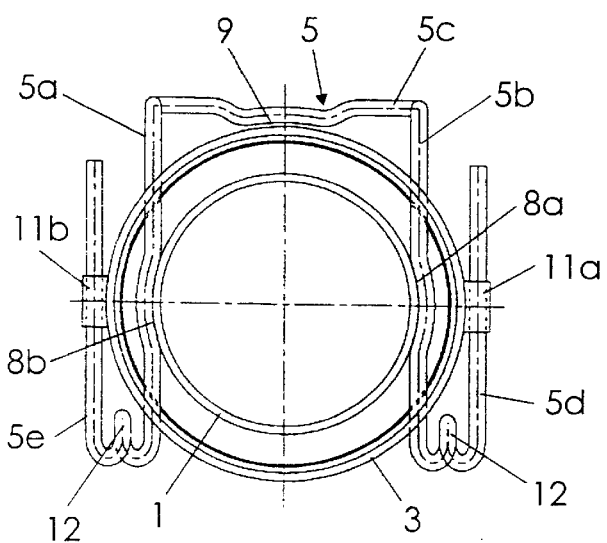
FIG. 7 shows a front view of a third embodiment.
Figure 8:
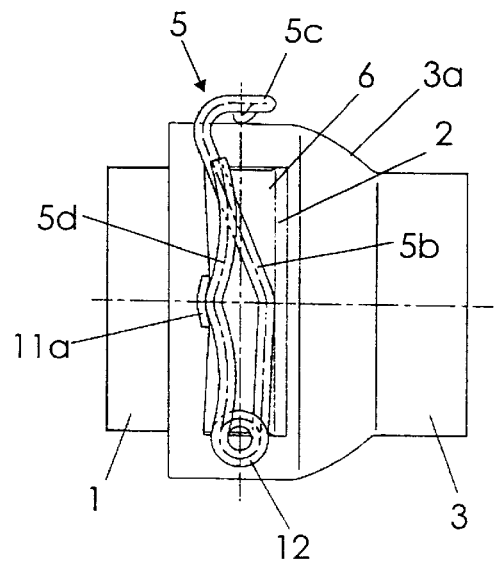
FIG. 8 shows a side view of the embodiment according to FIG. 7.

In FIGS. 5 and 6, as well as in FIGS. 7 and 8, further designs of wire spring 5 are described, which have a structure that is otherwise the same. So that wire spring 5 may have a contact point on each side on outer pipe 3, i.e., its connector piece 3a, brackets 11a and 11b may be pressed out of outer pipe 3 on each side. As a result, wire spring 5 has a contact point on each side on bead 2 of inner pipe 1 and on brackets 11a and 11b of the outer pipe. As can also be seen in FIGS. 5 and 6, wire spring 5 has double spring branches on each side with two inner spring branches 5a and 5b and two outer spring branches 5d and 5e. The two inner spring branches 5a and 5b contact bead 2 while outer spring branches 5d and 5e contact brackets 11a and 11b.

The embodiment shown in FIGS. 7 and 8 corresponds to the embodiment shown in FIGS. 5 and 6 with respect to the support of wire spring 5 with two double spring branches 5a to 5e. However, to reinforce the spring force, the spring is here provided with a spiral winding 12 in the intermediary area between the inner and outer spring branches. The number of windings in spiral winding 12 can be selected depending on the characteristic curve of wire spring 5 and the space available. This means a spiral wire spring 5 can be designed with one or several windings. Also the exact shape of wire spring 5 depends on the respective spring characteristic curve and the space available, so that other shapes and designs of wire spring 5 are also conceivable.

Figure 9:
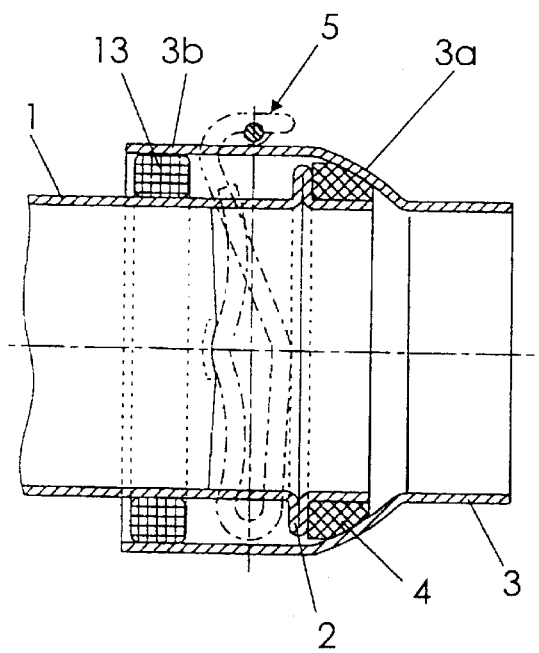
FIG. 9 shows a lengthwise section through a fourth embodiment.

For the pipe connection to have not only a vibration decoupling effect but also a damping effect, a wire cushion 13 can be inserted between the inner pipe and outer pipe 3. This embodiment is shown in FIG. 9. For this purpose, connector piece 3a of outer pipe 3 is provided with cylindrical extension 3b. Ring-shaped damping cushion 13 bridges the intermediate space between extension 3b and inner pipe 1. Damping cushion 13 made of wire can be designed in one or more parts and may cover the entire circumference of inner pipe 1. However, it is possible to use damping cushion 13 only in segments on the circumference. A spring damper system is obtained with the resulting possibility of tuning due to damping cushion 13. Additionally, a guiding and bearing function between two pipes 1 and 3 results. By using damper cushion 13, the two pipes can also be used at points at which the exhaust system would sag with standard spring-loaded pipe connections.

Figure 10:
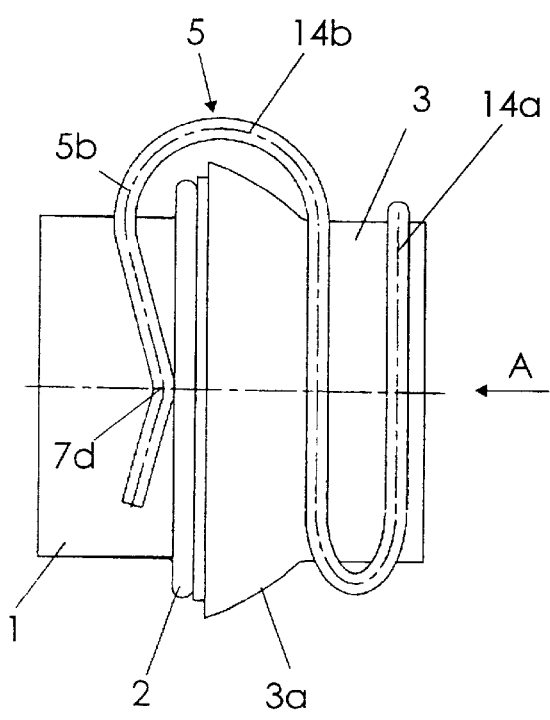
FIG. 10 shows a side view of a fifth embodiment.
Figure 11:
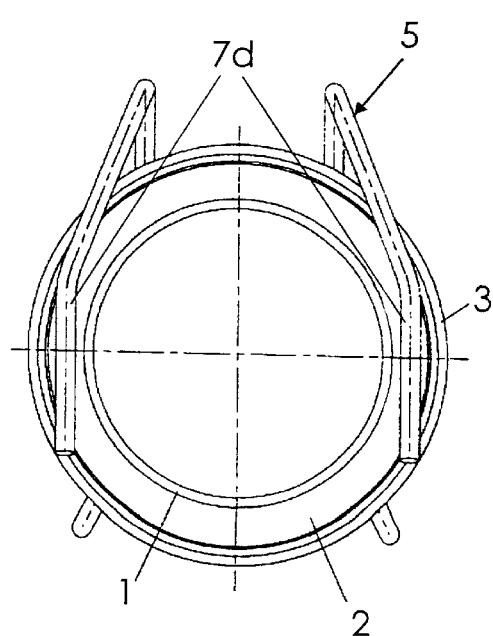
FIG. 11 shows a front view of the embodiment according to FIG. 10.
Figure 12:
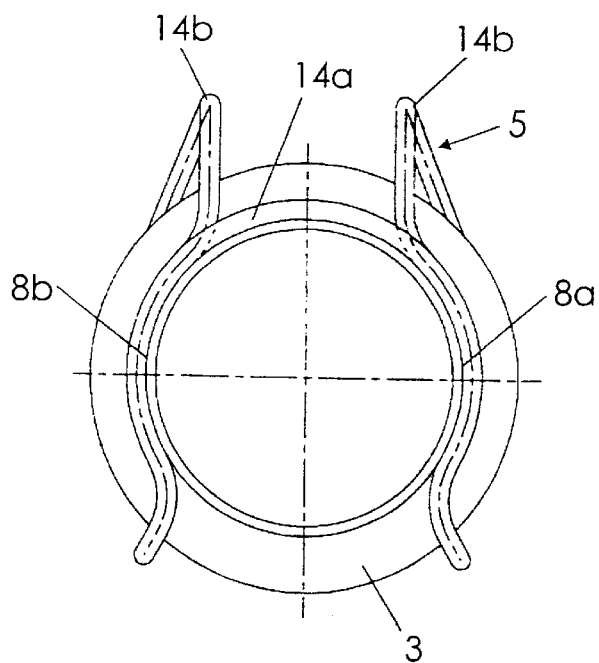
FIG. 12 shows a face view from arrow direction A in FIG. 10, opposite the view according to FIG. 11.

FIGS. 10, 11 and 12 show a fifth advantageous pipe connection embodiment. As can be seen from these drawings, wire spring 5 is designed in such a way that outer pipe 3 need not clearly project beyond inner pipe 1 but only has a connector piece 3a with a small extension in contact with bead 2 of inner pipe 3.

The design of the pipe connection according to FIGS. 10, 11 and 12 makes it possible to connect both pipes directly to each other with a very simply shaped single-piece wire spring 5 without one of the pipes having to be slit. On one side, wire spring 5 is form fit with pipe 3 (see FIGS. 10 and 12) and the pipe is surrounded almost 180° in an arc shape 14a. In this manner, wire spring 5 is centered and simultaneously secured against slipping out. On opposite sides, side branch 5a or 5b is connected to arch 14a with counter-arch 14b. Then on each side, each side branch 5a or 5b contacts contact point 7d at a point on bead 2 of pipe 1 (see FIGS. 10 and 11).

Figure 13:
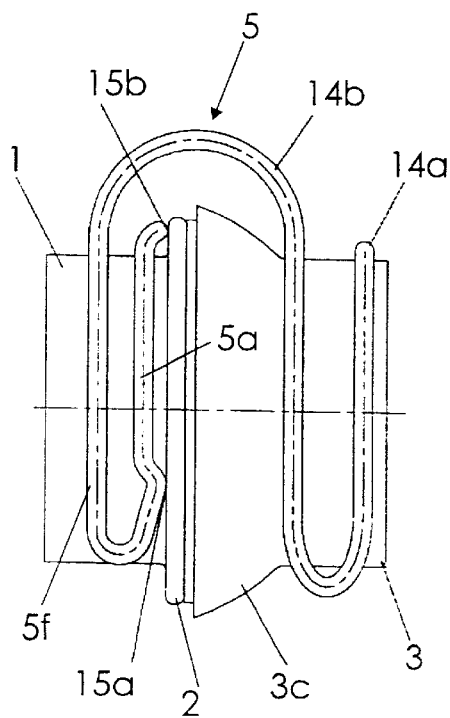
FIG. 13 shows a sixth embodiment in side view.
Figure 14:
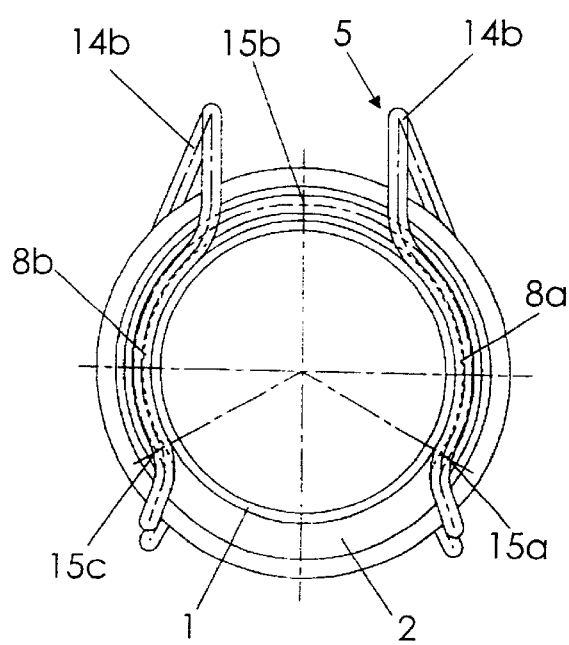
FIG. 14 shows a front view of the embodiment according to FIG. 13.

FIGS. 13 and 14 show a modification of the embodiment shown in FIGS. 10 to 12. Shaping wire spring 5 with an intermediate branch 5f on each side between counter-arch 14b and side branch 5a produces three contact points on ring bead 2, namely 15a and 15c on each side and 15b in an area between the two sides, e.g., on the top. In this manner, a uniform distribution of spring force over pipe bead 2 on sealing ring 4 is obtained. With this structure of wire spring 5, it is also possible to leave both ends of the wire spring, i.e., the two spring branches 5a and 5b, open or connect them mechanically to each other. Spring branches 5a and 5b can thus be not only connected to each other, but also to outer pipe 3 through arc shape 14a. Of course, however, separation of wire spring 5 is also possible by elimination of arc shape 14a. In such an embodiment, because of outer convexities 8a and 8b, wire spring 5 is held securely on outer pipe 3.

Instead of two (7d) or three (15a, 15b, and 15c) contact points on bead 2, an even multiple of the respective number of contact points is also possible i.e., 4, 6, 8×9, etc. To this end, it is only necessary to design wire spring 5 appropriately.

Figure 15:
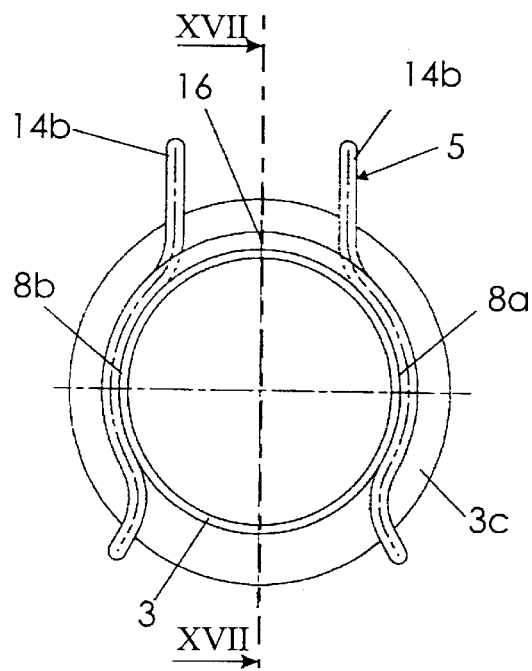
FIG. 15 shows a seventh embodiment in front view.
Figure 16:
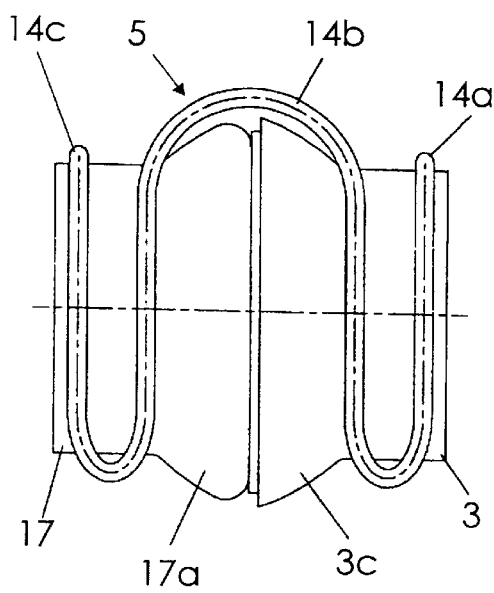
FIG. 16 shows a side view of the embodiment according to FIG. 15.
Figure 17:
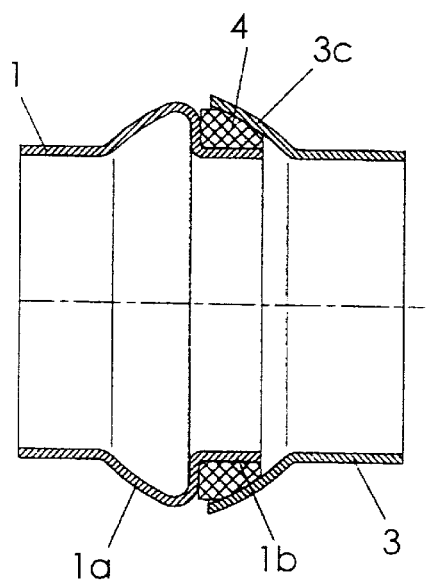
FIG. 17 shows a cross-section along Line XVII—XVII according to FIG. 15, without a wire spring.

FIGS. 15 to 17 show an embodiment of the pipe connection in which the connector pieces can be designed in a spherical form 1a and/or 3c on both pipes 1 and 3 (see FIG. 17, which shows a cross-section without a wire spring). Connector piece 3c of pipe 3 is designed as a pipe bell and the opposing piece, connector piece 1a, as a pipe bead, to which an additional cylindrical part 1b is connected. Seal ring 4 is inserted in this case between cylindrical part 1b and pipe bell-shaped extension 3c of pipe 3.

Because of this spherical shape of the two pipe ends, wire spring 5 can be designed to be fully symmetrical as can be seen in FIGS. 15 and 16. This prevents wire spring 5 from being incorrectly installed. As can be seen, arc shape 14a of wire spring 5 is repeated on the other pipe piece, namely pipe 1, by arc shape 14c formed in the same way. Depending on the requirement, wire spring 5 can be left open at both ends or mechanically connected.

Because of the multiple possibilities of suspension and damping properties using wire spring 5, the exhaust system can be better tuned to the particular vibration problems of a vehicle.

Since wire spring 5 is only inserted, both initial assembly by the vehicle manufacturer and replacement in repairs is free of problems and cost-effective.

What is claimed is:

1. A device for connecting two tubular piping parts, the device comprising:

first and second connector pieces, the first connector piece including a stop, the second connector piece including an abutment;

a sealing device mounted between the first and second connector pieces; and a spring device having a wire spring, the wire spring including two spring branches and another area disposed therebetween, the spring device surrounding the second connector piece at least partially with the two spring branches, the spring device being supported by the second connector piece, the spring device being urged against the stop and in an opposing direction against the abutment by at least one of the spring branches and the other area of the wire spring so as to urge the first and second connector pieces against each other in an axial direction and wherein the wire spring includes a press-in plate disposed on the other area for facilitating assembly of the device.

2. The device as recited in claim 1 wherein the first and second connector pieces are part of a motor vehicle exhaust system.

3. The device as recited in claim 1 wherein the second connector piece includes slots lying on opposite sides of the connector, the two spring branches being inserted into the slots.

4. The device as recited in claim 3 wherein each spring branch includes an inner and an outer spring branch, the inner spring branches being supported by the stop, the outer spring branches being supported by the abutment.

5. The device as recited in claim 4 wherein the stop forms a ring bead and the abutment is formed by two radially outward extending brackets.

6. The device as recited in claim 4 wherein the wire spring includes at least one spiral winding between the inner and outer spring branches.

7. The device as recited in claim 3 wherein the stop forms a ring bead.

8. The device according to claim 1 further comprising a ring-shaped damper cushion, and wherein one of the first and second connector pieces includes a cylinder-shaped extension forming an intermediate space between the extension and the other of the first and second connector pieces, the ring-shaped damper cushion being disposed in the extension and bridging the intermediate space.

9. The device as recited in claim 1 wherein the wire spring surrounds at least one of the first and second connector pieces in an arc of at least approximately 180 degrees, one spring branch extending from an end of the arc in a counter arc over the other of the first and second connector pieces, and each spring branch being pressed against the stop at at least one contact point.

10. The device as recited in claim 9 wherein the wire spring forms at least a third contact point with the stop between the two spring branches, the wire spring being pressed against the stop at the at least third contact point.

11. The device as recited in claim 9 wherein the two spring branches are joined so that the wire spring is closed.

12. The device as recited in claim 9 wherein the two connector pieces are at least approximately ball-shaped and the wire spring is symmetrical.

13. The device as recited in claim 1 wherein the wire spring is a round wire.

14. A device for connecting two tubular piping parts, the device comprising:
   first and second connector pieces, the first connector piece including a stop wherein the stop forms a ring bead, the second connector piece including slots lying on opposite sides of the connector wherein an abutment is formed by the slots and wherein the abutment is further formed by two radially outward extending brackets;
   a sealing device mounted between the first and second connector pieces; and
   a spring device having a wire spring, the wire spring including two spring branches and another area disposed therebetween, each spring branch including an inner and an outer spring branch, the spring device surrounding the second connector piece at least partially with the two spring branches, the spring device being supported by the second connector piece, the two spring branches of the spring device being inserted into the slots and being urged against the stop and in an opposing direction against the abutment such that the inner spring branches are supported by the stop and the outer spring branches are supported by the abutment so as to urge the first and second connector pieces against each other in an axial direction.

15. The device as recited in claim 14 wherein the first and second connector pieces are part of a motor vehicle exhaust system.

16. The device as recited in claim 14 wherein the wire spring includes at least one spiral winding between the inner and outer spring branches.

17. The device according to claim 14 further comprising a ring-shaped damper cushion, and wherein one of the first and second connector pieces includes a cylinder-shaped extension forming an intermediate space between the extension and the other of the first and second connector pieces, the ring-shaped damper cushion being disposed in the extension and bridging the intermediate space.

18. The device as recited in claim 14 wherein the wire spring is a round wire.

19. The device as recited in claim 14 wherein the wire spring includes a press-in plate disposed on the other area for facilitating assembly of the device.

20. A device for connecting two tubular piping parts, the device comprising:
   first and second connector pieces, the first connector piece including a stop, the second connector piece including an abutment;
   a sealing device mounted between the first and second connector pieces; and
   a spring device having a wire spring, the wire spring including two spring branches and another area disposed therebetween wherein the wire spring surrounds at least one of the first and second connector pieces with the two spring branches in an arc of at least approximately 180 degrees and wherein the spring device is supported by the at least one of the first and second connector pieces, each spring branch extending from an end of the arc in a counter arc over the other of the first and second connector pieces, the spring device being urged against the stop and in an opposing direction against the abutment by the spring branches and the other area of the wire spring such that each spring branch is urged against the stop at at least one contact point so as to urge the first and second connector pieces against each other in an axial direction.

21. The device as recited in claim 20 wherein the first and second connector pieces are part of a motor vehicle exhaust system.

22. The device as recited in claim 20 wherein the stop forms a ring bead.

23. The device as recited in claim 20 wherein the wire spring forms at least a third contact point with the stop between the two spring branches, the wire spring being pressed against the stop at the at least third contact point.

24. The device as recited in claim 20 wherein the two spring branches are joined so that the wire spring is closed.

25. The device as recited in claim 20 wherein the two connector pieces are at least approximately ball-shaped and the wire spring is symmetrical.

26. The device as recited in claim 20 wherein the wire spring is a round wire.

27. The device as recited in claim 20 wherein the wire spring includes a press-in plate disposed on the other area for facilitating assembly of the device.

* * * * *